United States Patent
Packer et al.

(10) Patent No.: US 12,345,180 B2
(45) Date of Patent: Jul. 1, 2025

(54) STATOR PLENUM FOR A GAS TURBINE ENGINE

(71) Applicant: General Electric Company, Schenectady, NY (US)

(72) Inventors: Travis J. Packer, Evendale, OH (US); Michael A. Hile, Evendale, OH (US); James H. Grooms, Evendale, OH (US)

(73) Assignee: General Electric Company, Evendale, OH (US)

( * ) Notice: Subject to any disclaimer, the term of this patent is extended or adjusted under 35 U.S.C. 154(b) by 12 days.

(21) Appl. No.: 17/580,426

(22) Filed: Jan. 20, 2022

(65) Prior Publication Data

US 2023/0228202 A1   Jul. 20, 2023

(51) Int. Cl.
| | |
|---|---|
| *F01D 9/06* | (2006.01) |
| *F01D 9/04* | (2006.01) |
| *F01D 11/00* | (2006.01) |
| *F01D 11/02* | (2006.01) |
| *F01D 25/24* | (2006.01) |

(52) U.S. Cl.
CPC ............ *F01D 9/065* (2013.01); *F01D 9/041* (2013.01); *F01D 11/001* (2013.01); *F01D 11/025* (2013.01); *F01D 25/246* (2013.01)

(58) Field of Classification Search
CPC ........ F01D 9/065; F01D 9/041; F01D 11/001; F01D 11/025; F01D 25/246; F01D 25/26; F01D 25/265; F01D 25/145; F01D 11/24; F01D 9/00; F05D 2250/183; F05D 2250/184; F05D 2250/185; F05D 2250/323; F05D 2250/711; F05D 2250/712; F05D 2250/713; F05D 2250/232; F05D 2230/642; F23R 3/60; F23R 3/002; F23R 3/08; F23R 2900/00012; Y02T 50/60
See application file for complete search history.

(56) References Cited

U.S. PATENT DOCUMENTS

| | | | |
|---|---|---|---|
| 2,915,280 A | 12/1959 | Sonder | |
| 3,275,294 A * | 9/1966 | Allen | ...... F01D 5/081 415/137 |
| 3,295,824 A * | 1/1967 | Woodwell | ...... F01D 9/041 415/178 |
| 3,299,631 A * | 1/1967 | Szydlowski | ...... F23R 3/38 123/27 R |

(Continued)

FOREIGN PATENT DOCUMENTS

| | | |
|---|---|---|
| FR | 3024493 | 2/2016 |
| GB | 2037380 | 7/1980 |

*Primary Examiner* — David E Sosnowski
*Assistant Examiner* — Wayne A Lambert
(74) *Attorney, Agent, or Firm* — HANLEY, FLIGHT & ZIMMERMAN, LLC (57) ABSTRACT

Methods, apparatus, systems, and articles of manufacture are disclosed to implement a stator plenum with collet seal. The stator plenum for a gas turbine engine includes an outer shell circumscribing a centerline axis, a first end of the outer shell coupled to an engine casing at a first coupling, the first coupling to form a first seal, a second end of the outer shell coupled to the engine casing at a second coupling, the second end formed by a thickened portion of the outer shell, the second coupling to form a second seal, and a cavity formed by the outer shell, the cavity to contain cooling flow to reduce a temperature of a turbine.

17 Claims, 5 Drawing Sheets

(56) References Cited

U.S. PATENT DOCUMENTS

| | | | | |
|---|---|---|---|---|
| 3,314,648 A * | 4/1967 | Howald | ............... | F01D 11/08 415/174.4 |
| 3,529,903 A * | 9/1970 | Scalzo | ............... | F01D 9/041 415/115 |
| 3,583,824 A * | 6/1971 | Smuland | ............... | F01D 11/18 415/173.1 |
| 3,800,864 A * | 4/1974 | Hauser | ............... | F01D 25/12 165/47 |
| 3,945,758 A * | 3/1976 | Lee | ............... | F01D 5/187 415/115 |
| 4,017,207 A * | 4/1977 | Bell | ............... | F01D 11/08 415/117 |
| 4,126,405 A * | 11/1978 | Bobo | ............... | F01D 9/042 415/115 |
| 4,230,436 A * | 10/1980 | Davison | ............... | F01D 11/24 415/138 |
| 4,314,792 A * | 2/1982 | Chaplin | ............... | G01L 19/143 415/135 |
| 4,314,793 A * | 2/1982 | DeTolla | ............... | F01D 11/005 415/137 |
| 4,682,064 A * | 7/1987 | Crounse | ............... | H02K 9/18 310/59 |
| 5,407,319 A * | 4/1995 | Harrogate | ............... | F01D 11/005 415/115 |
| 5,597,286 A * | 1/1997 | Dawson | ............... | F01D 9/065 415/142 |
| 5,987,879 A * | 11/1999 | Ono | ............... | F01D 9/023 60/800 |
| 6,129,513 A | 10/2000 | Halliwell et al. | | |
| 6,163,959 A * | 12/2000 | Arraitz | ............... | F01D 9/065 29/889.1 |
| 6,702,549 B2 | 3/2004 | Tiemann | | |
| 6,719,524 B2 * | 4/2004 | Nguyen | ............... | F01D 9/065 415/176 |
| 6,966,189 B2 * | 11/2005 | Lapergue | ............... | F02K 1/805 60/771 |
| 7,140,840 B2 * | 11/2006 | Taillant | ............... | F01D 11/005 277/654 |
| 7,909,569 B2 * | 3/2011 | Durocher | ............... | F01D 25/243 415/138 |
| 8,069,648 B2 * | 12/2011 | Snyder | ............... | F02K 1/822 60/761 |
| 8,608,436 B2 | 12/2013 | Wines et al. | | |
| 9,828,867 B2 * | 11/2017 | Budnick | ............... | F01D 11/005 |
| 10,138,742 B2 * | 11/2018 | Budnick | ............... | F01D 9/041 |
| 10,753,214 B2 | 8/2020 | Imfeld et al. | | |
| 2006/0032237 A1 * | 2/2006 | Aumont | ............... | F01D 25/246 60/752 |
| 2007/0151259 A1 * | 7/2007 | Thornton | ............... | F23R 3/60 60/797 |
| 2008/0253884 A1 * | 10/2008 | Snyder | ............... | F02C 7/18 415/208.1 |
| 2012/0051917 A1 * | 3/2012 | Wines | ............... | F01D 11/005 416/179 |
| 2013/0309078 A1 * | 11/2013 | Vo | ............... | F01D 11/08 415/208.1 |
| 2017/0226861 A1 | 8/2017 | Evain et al. | | |
| 2017/0292702 A1 * | 10/2017 | Sander | ............... | F23R 3/60 |
| 2019/0078514 A1 * | 3/2019 | Eastwood | ............... | F01D 11/24 |

* cited by examiner

FIG. 7

US 12,345,180 B2

STATOR PLENUM FOR A GAS TURBINE ENGINE

STATEMENT REGARDING FEDERALLY SPONSORED RESEARCH OR DEVELOPMENT

This invention was made with United States Government support. The United States Government may have certain rights in the invention.

FIELD OF THE DISCLOSURE

This disclosure relates generally to stators for gas turbines and, more particularly, to stator plenum with collet seal.

BACKGROUND

A gas turbine engine generally includes, in serial flow order, an inlet section, a compressor section, a combustion section, a turbine section, and an exhaust section. In operation, air enters the inlet section and flows to the compressor section where one or more axial compressors progressively compress the air until it reaches the combustion section, thereby creating combustion gases. The combustion gases flow from the combustion section through a hot gas path defined within the turbine section and then exit the turbine section via the exhaust section.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially the same size" refers to dimensions that may not be exactly identical due to manufacturing tolerances and/or other real world imperfections. Thus, unless otherwise specified, "substantially the same size" refers to +/−10 percent of a dimension. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

DETAILED DESCRIPTION

During normal engine operation, one or more portions of the engine can generate heat. The heat (e.g., thermal energy) can cause decreased performance of the engine and wear on the components. There is a continuing need to reduce heat generated during engine operation. Certain examples provide a stator plenum with a collet seal that can reduce heat (e.g., provide cooling) on engine components (e.g., high pressure turbine, low pressure turbine, etc.), improving engine performance and durability. Examples disclosed herein utilize compressor bleed air to reduce heat in downstream engine components and, thus, increase engine efficiency.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized. The following detailed description is, therefore, provided to describe an example implementation and not to be taken limiting on the scope of the subject matter described in this disclosure. Certain features from different aspects of the following description may be combined to form yet new aspects of the subject matter discussed below.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

The terms "upstream" and "downstream" refer to the relative direction with respect to fluid flow in a fluid pathway. For example, "upstream" refers to the direction from which the fluid flows, and "downstream" refers to the direction to which the fluid flows. As used herein, "vertical" refers to the direction perpendicular to the ground. As used herein, "horizontal" refers to the direction parallel to the centerline of the turbofan. As used herein, "lateral" refers to the direction perpendicular to the axial vertical directions (e.g., into and out of the plane of FIGS. 1, 2, etc.).

Various terms are used herein to describe the orientation of features. As used herein, the orientation of features, forces and moments are described with reference to the axial direction, radial direction, and circumferential direction of the vehicle associated with the features, forces and moments. In general, the attached figures are annotated with a set of axes including the axial axis A, the radial axis R, and the circumferential axis C. Additionally or alternatively, the attached figures are annotated with a set of axes including the roll axis R, the pitch axis P, and the yaw axis Y.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Gas turbine engines include one or more compressors. The compressor(s) can generate high pressure air for mixing with fuel to burn and provide combustion gases. In some examples, the compressor(s) can generate an amount of compressed air in excess of what is used for generating combustion gases. In these examples, the excess compressed air (e.g., compressor bleed air) can be used for secondary operations such as cooling of engine components, engine anti-icing, pneumatic actuators, etc.

In some prior examples, the compressor bleed air is directed toward cooling of engine components (e.g., high pressure turbine shroud). However, in these examples, while the compressor bleed air is directed toward the engine components (e.g., the high pressure turbine shroud), the compressor bleed air is not contained near such components. Thus, the compressor bleed air can move radially outward away from the engine components (e.g., the high pressure turbine shroud) reducing the cooling effect.

In some prior examples, compressor bleed air containment structures are used to contain the cooling air flow near the engine components (e.g., the high pressure turbine shroud). However, there are difficulties in maintaining a seal in such containment structures. For example, the containment structure can move (e.g., radially and/or axially) relative to the engine components (e.g., the high pressure turbine shroud) during engine operation (e.g., during transients). Such movement of the containment structure can cause difficulties in maintaining a seal of the containment structure.

Examples disclosed herein can contain cooling air (e.g., compressor bleed air) near engine components (e.g., the high pressure turbine shroud). Examples disclosed herein maintain a seal around the cooling air using sealing techniques that allow for relative movement and flexibility. By allowing for relative movement and flexibility of the containment structure, the seal is maintained throughout engine operation.

Reference now will be made in detail to examples of the present disclosure, one or more examples of which are illustrated in the drawings. Each example is provided by way of explanation of the present disclosure, not limitation of the present disclosure. In fact, it will be apparent to those skilled in the art that various modifications and variations can be made in the present disclosure without departing from the scope or spirit of the present disclosure. For instance, features illustrated or described as part of one example can be used with another example to yield a still further example. Thus, it is intended that the present disclosure covers such modifications and variations as come within the scope of the appended claims and their equivalents.

Figure 1:
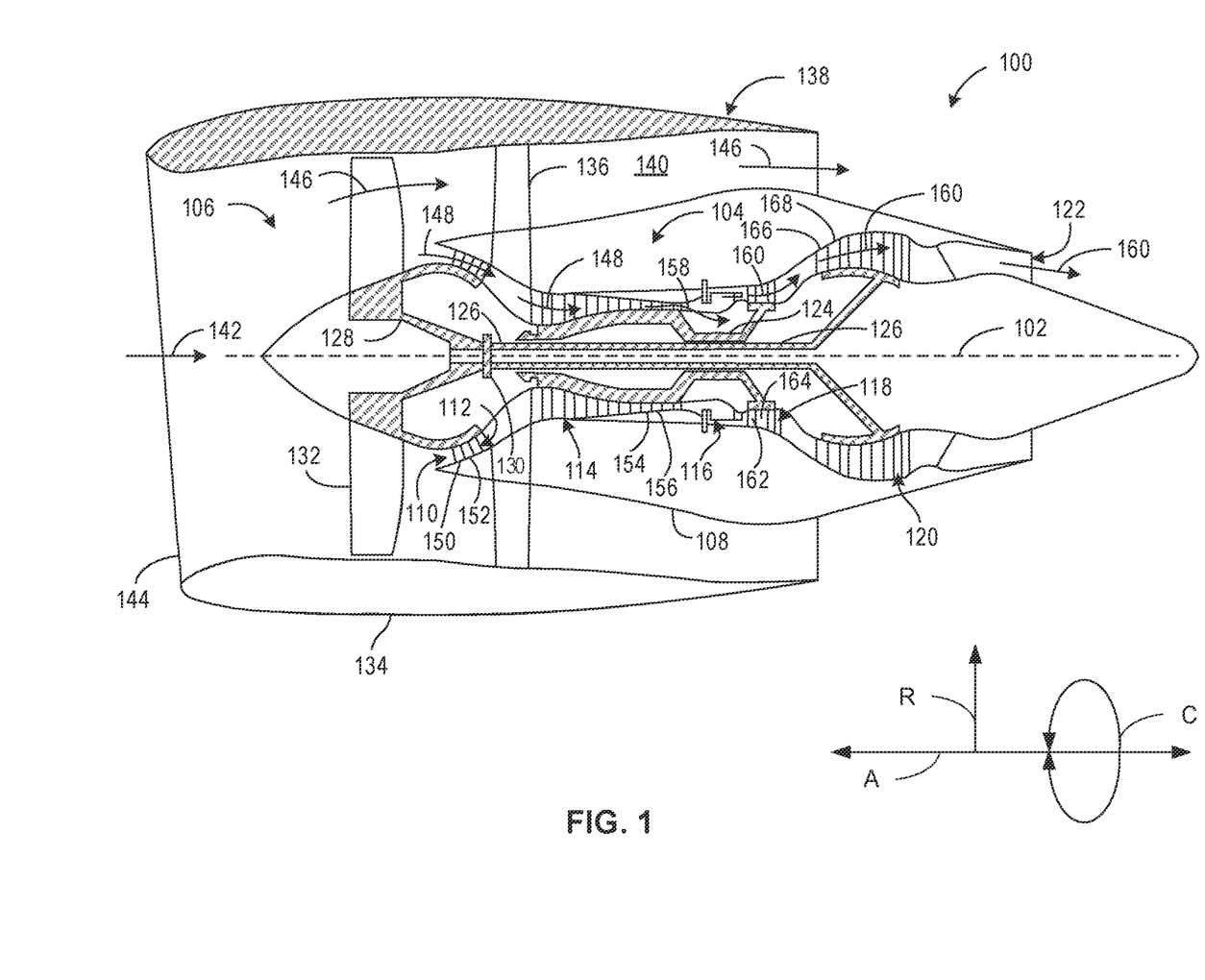
FIG. 1 illustrates an example gas turbine engine.

FIG. 1 is a schematic cross-sectional view of a prior art turbofan-type gas turbine engine 100 ("turbofan 100"). As shown in FIG. 1, the turbofan 100 defines a longitudinal or axial centerline axis 102 extending therethrough for reference. In general, the turbofan 100 may include a core turbine 104 or gas turbine engine disposed downstream from a fan section 106.

The core turbine 104 generally includes a substantially tubular outer casing 108 ("turbine casing 108") that defines an annular inlet 110. The outer casing 108 can be formed from a single casing or multiple casings. The outer casing 108 encloses, in serial flow relationship, a compressor section having a booster or low pressure compressor 112 ("LP compressor 112") and a high pressure compressor 114 ("HP compressor 114"), a combustion section 116, a turbine section having a high pressure turbine 118 ("HP turbine 118") and a low pressure turbine 120 ("LP turbine 120"), and an exhaust section 122. A high pressure shaft or spool 124 ("HP shaft 124") drivingly couples the HP turbine 118 and the HP compressor 114. A low pressure shaft or spool 126 ("LP shaft 126") drivingly couples the LP turbine 120 and the LP compressor 112. The LP shaft 126 may also couple to a fan spool or shaft 128 of the fan section 106 ("fan shaft 128"). In some examples, the LP shaft 126 may couple directly to the fan shaft 128 (i.e., a direct-drive configuration). In alternative configurations, the LP shaft 126 may couple to the fan shaft 128 via a reduction gearbox 130 (e.g., an indirect-drive or geared-drive configuration).

As shown in FIG. 1, the fan section 106 includes a plurality of fan blades 132 coupled to and extending radially outwardly from the fan shaft 128. An annular fan casing or nacelle 134 circumferentially encloses the fan section 106 and/or at least a portion of the core turbine 104. The nacelle 134 is supported relative to the core turbine 104 by a plurality of circumferentially-spaced apart outlet guide vanes 136. Furthermore, a downstream section 138 of the nacelle 134 can enclose an outer portion of the core turbine 104 to define a bypass airflow passage 140 therebetween.

As illustrated in FIG. 1, air 142 enters an inlet portion 144 of the turbofan 100 during operation thereof. A first portion 146 of the air 142 flows into the bypass airflow passage 140, while a second portion 148 of the air 142 flows into the inlet 110 of the LP compressor 112. One or more sequential stages of LP compressor stator vanes 150 and a plurality of LP compressor rotor blades 152 coupled to the LP shaft 126 progressively compress the second portion 148 of the air 142 flowing through the LP compressor 112 enroute to the HP compressor 114. Next, one or more sequential stages of HP compressor stator vanes 154 and a plurality of HP compressor rotor blades 156 coupled to the HP shaft 124 further compress the second portion 148 of the air 142 flowing through the HP compressor 114. This provides compressed air 158 to the combustion section 116 where it mixes with fuel and burns to provide combustion gases 160.

The combustion gases 160 flow through the HP turbine 118 in which one or more sequential stages of HP turbine stator vanes 162 and a plurality of HP turbine rotor blades 164 coupled to the HP shaft 124 extract a first portion of kinetic and/or thermal energy from the combustion gases 160. This energy extraction supports operation of the HP compressor 114. The combustion gases 160 then flow through the LP turbine 120 where one or more sequential stages of LP turbine stator vanes 166 and a plurality of LP turbine rotor blades 168 coupled to the LP shaft 126 extract a second portion of thermal and/or kinetic energy therefrom. This energy extraction causes the LP shaft 126 to rotate, thereby supporting operation of the LP compressor 112 and/or rotation of the fan shaft 128. The combustion gases 160 then exit the core turbine 104 through the exhaust section 122 thereof.

Along with the turbofan 100, the core turbine 104 serves a similar purpose and sees a similar environment in land-based gas turbines, turbojet engines in which the ratio of the first portion 146 of the air 142 to the second portion 148 of the air 142 is less than that of a turbofan, and unducted fan engines in which the fan section 106 is devoid of the nacelle 134. In each of the turbofan, turbojet, and unducted engines, a speed reduction device (e.g., the reduction gearbox 130) may be included between any shafts and spools. For example, the reduction gearbox 130 may be disposed between the LP shaft 126 and the fan shaft 128 of the fan section 106.

Figure 2:
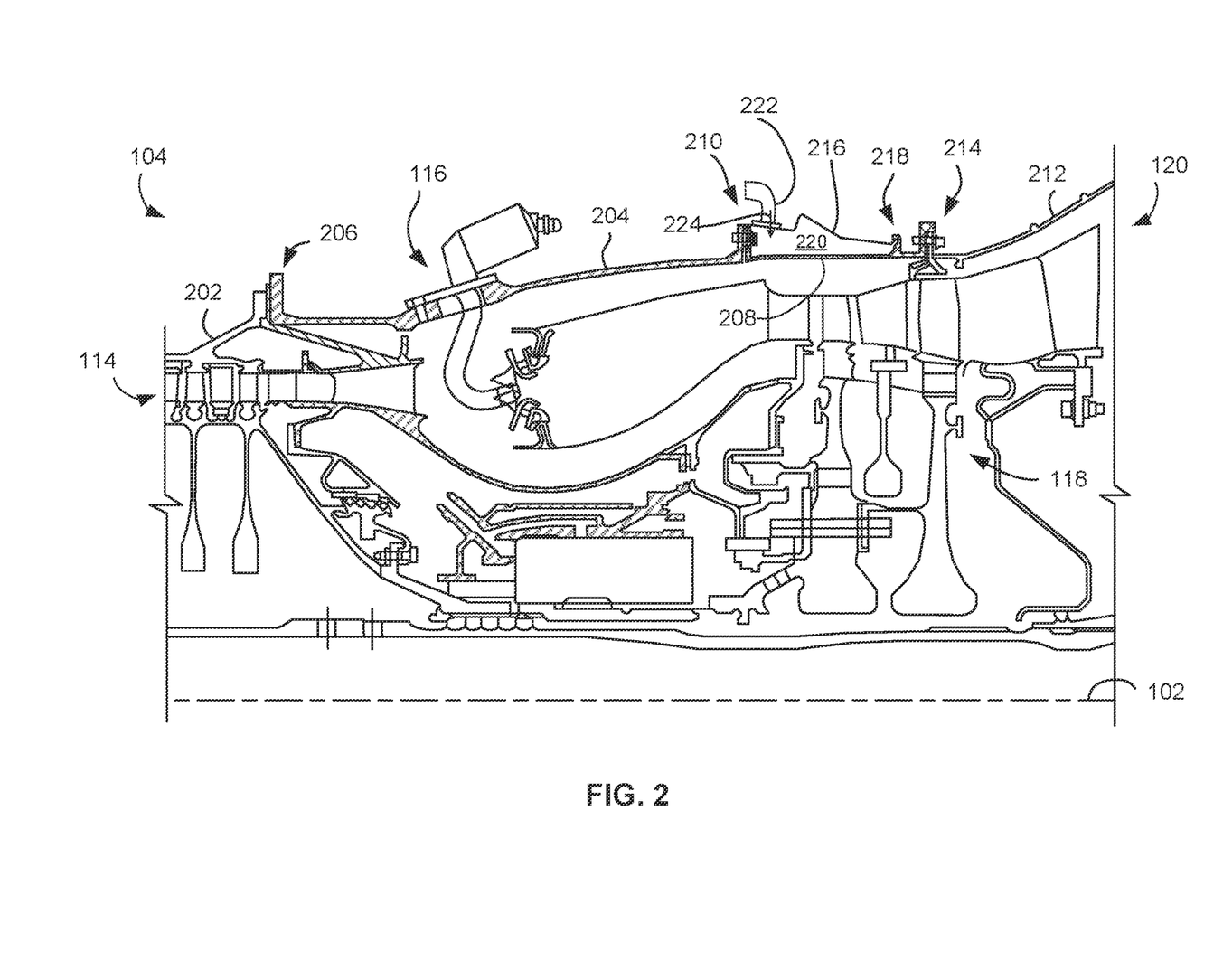
FIG. 2 illustrates an example cross-sectional side view of a core turbine of the example gas turbine engine.

FIG. 2 illustrates an example core turbine 104 that can be implemented in the example turbofan 100 shown in FIG. 1. The example core turbine 104 is illustrated with respect to the axial centerline axis 102. In FIG. 2, the core turbine 104 includes the HP compressor 114 having a compressor casing 202. The example core turbine 104 of FIG. 2 includes the combustion section 116 having a forward combustor casing 204. The forward combustor casing 204 is coupled to the compressor casing 202 at a forward flange joint assembly 206. The example combustion section 116 of FIG. 2 includes a rear combustor casing 208. The forward combustor casing 204 is coupled to the rear combustor casing 208 at an intermediate flange joint assembly 210. The example core turbine 104 of FIG. 2 includes a turbine casing 212. The turbine casing is coupled to the rear combustor casing 208 at a rear flange joint assembly 214.

The example core turbine 104 of FIG. 2 includes a stator plenum 216. The stator plenum 216 is coupled to the rear combustor casing 208 between the intermediate flange joint assembly 210 and the rear flange joint assembly 214. At a front end of the stator plenum 216, the stator plenum 216 is coupled to the forward combustor casing 204 and the rear combustor casing 208 at the intermediate flange joint assembly 210. At a rear end of the stator plenum 216, the stator plenum 216 is coupled to the rear combustor casing 208 at a rabbet joint assembly 218. The rabbet joint assembly 218 can couple the rear end of the stator plenum 216 to the rear combustor casing 208 while allowing for movement (e.g., radially and/or axially) of the stator plenum 216. In some examples, a flange joint assembly (e.g., the intermediate flange joint assembly 210) can be at a rear end of the stator plenum 216 while a rabbet joint assembly (e.g., the rabbet joint assembly 218) can be at a front end of the stator plenum 216.

The stator plenum 216 forms a plenum cavity 220 between the stator plenum 216 and the rear combustor casing 208. Coupled to the stator plenum 216 is a compressor bleed tube 222. The compressor bleed tube 222 delivers a cooling flow 224 (e.g., compressor bleed air, compressor offtake, etc.) to the plenum cavity 220 for cooling of turbine components (e.g., the HP turbine 118, the LP turbine 120, etc.). For example, during engine operation, one or more compressors (e.g., the LP compressor 112 and/or the HP compressor 114) generate compressed air (e.g., compressor offtake) which is not used for combustion by a combustor (e.g., the combustion section 116). The compressed air can form some or all of the cooling flow 224, for example. The cooling flow 224 (e.g., compressor bleed air, compressor offtake, etc.) travels via the compressor bleed tube 222 to the plenum cavity 220 of the stator plenum 216. From the stator plenum 216, the cooling flow 224 provides cooling to engine components (e.g., the HP turbine 118, the LP turbine 120, etc.). In some examples, a second source of the cooling flow 224 different than the compressor section (e.g., LP compressor 112 and/or HP compressor 114) can form some or all of the cooling flow 224.

Figure 3:
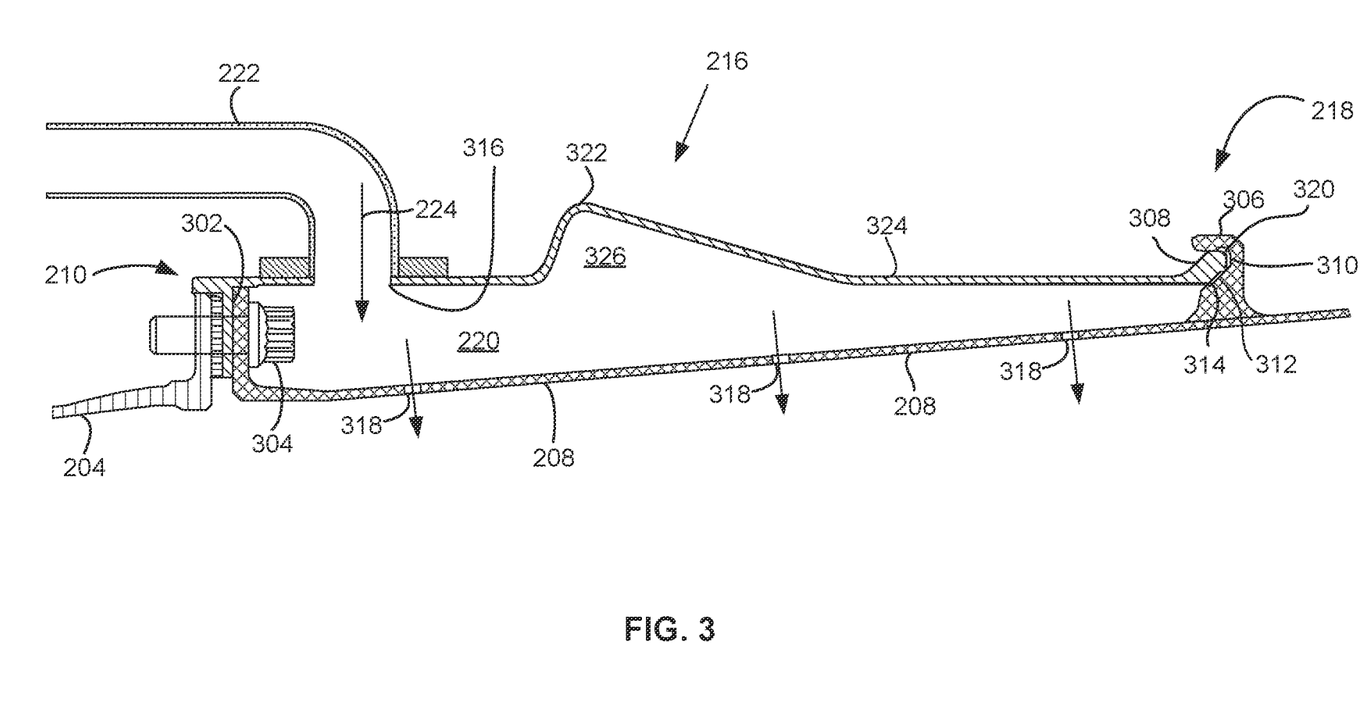
FIG. 3 illustrates an example cross-sectional side view of a first example stator plenum.

FIG. 3 illustrates an example cross-sectional side view of the stator plenum 216 shown in FIG. 2. The example stator plenum 216 disclosed herein can be implemented with the turbofan 100 of FIG. 1, for example. As described above, the example stator plenum 216 is coupled to the forward combustor casing 204 and the rear combustor casing 208 via the intermediate flange joint assembly 210 at the front end of the stator plenum 216. The example stator plenum 216 includes a plenum flange 302 for coupling of the stator plenum 216 in the intermediate flange joint assembly 210. The intermediate flange joint assembly 210 includes a fastener 304 that provides means for the coupling (e.g., fixed coupling) of the plenum flange 302 to the combustor casing (e.g., the forward combustor casing 204 and/or the rear combustor casing 208). The intermediate flange joint assembly 210 forms a front seal of the stator plenum 216. For example, as a result of the coupling of the stator plenum 216 to the forward combustor casing 204 and the rear combustor casing 208 via the intermediate flange joint assembly 210, the cooling flow 224 is sealed within the plenum cavity 220 at a front portion of the stator plenum 216.

As described above, at the rear end of the stator plenum 216, the stator plenum 216 is coupled to the rear combustor casing 208 via the rabbet joint assembly 218. The rabbet joint assembly 218 includes a rabbet flange 306. In the illustrated example, the rabbet flange 306 is fixedly coupled to the rear combustor casing 208. The example rabbet joint assembly 218 includes a plenum end rabbet 308. The plenum end rabbet 308 is an end portion of the stator plenum 216 configured to couple the stator plenum 216 to the rabbet flange 306 in the rabbet joint assembly 218. In the illustrated example, the plenum end rabbet 308 is formed by a thickened portion of an outer surface 324 (e.g., an outer shell, an outer wall, etc.) of the stator plenum 216 at a rear end of the outer surface 324. The rabbet flange 306 forms a cavity 310 to receive the plenum end rabbet 308. The example cavity 310 is tapered axially in a direction away from the plenum end rabbet 308. The cavity 310 of FIG. 3 includes an angled portion 312. In the example of FIG. 3, the angled portion 312 is located on an interior portion (e.g., closer to the axial centerline axis 102 of FIG. 2) of the cavity 310. The plenum end rabbet 308 of FIG. 3 includes a corresponding angled portion 314. At the rabbet joint assembly 218, the plenum end rabbet 308 is coupled to the rabbet flange 306 via insertion into the cavity 310. In some examples, the stator plenum 216 is first assembled at the intermediate flange joint assembly 210 and then compressed axially (e.g., in the direction of the axial centerline axis 102 of FIG. 2) to allow the plenum end rabbet 308 to be inserted into the cavity 310 of the rabbet flange 306.

During insertion, the angled portion 314 of the plenum end rabbet 308 can slide along the angled portion 312 of the rabbet flange 306 to help in insertion and placement of the plenum end rabbet 308 in the cavity 310. In some examples, the stator plenum 216 maintains the axial compression after assembly (e.g., during engine operation). In other words, the stator plenum 216 can be spring loaded between the plenum flange 302 and the plenum end rabbet 308. The rabbet joint assembly 218 forms a rear seal of the stator plenum 216. For example, as a result of the coupling of the stator plenum 216 to the rear combustor casing 208 via the rabbet joint assembly 218, the cooling flow 224 is sealed within the plenum cavity 220 at a rear portion of the stator plenum 216.

The stator plenum 216 of FIG. 3 is coupled to the compressor bleed tube 222. The compressor bleed tube 222 provides transport for the cooling flow 224 from a source (e.g., the LP compressor 112 and/or the HP compressor 114) to the stator plenum 216. A cooling flow intake opening 316 in the outer surface 324 of the stator plenum 216 provides fluid communication between the compressor bleed tube 222 and the cavity 220 of the stator plenum 216. For example, during engine operation, the compressor section (e.g., the LP compressor 112 and/or the HP compressor 114 of FIG. 1) can generate excess compressed air which is not to be used for combustion. The excess compressed air (e.g., compressor offtake) travels via the compressor bleed tube 222 as the cooling flow 224. The cooling flow 224 (e.g., compressor offtake) enters the cavity 220 of the stator plenum 216 via the cooling flow intake opening 316.

The rear combustor casing 208 illustrated in FIG. 3 includes a plurality of openings 318. The plurality of openings 318 allow for fluid communication between the cavity 220 and a portion of the engine located interior (e.g., closer to the axial centerline axis 102 of FIG. 2) of the stator plenum 216. In some examples, the stator plenum 216 is located exterior (e.g., away from the axial centerline axis 102 of FIG. 2) of the HP turbine 118. In other examples, the stator plenum 216 is located exterior of the LP turbine 120. In other examples, the stator plenum 216 is located exterior of both the HP turbine 118 and the LP turbine 120. For example, the cooling flow 224 can travel from the cavity 220 through the openings 318 to a shroud of the HP turbine 118 and/or a shroud of the LP turbine 120. In this example, the cooling flow 224 can provide cooling for the HP turbine 118 and/or the LP turbine 120.

In some examples, the openings 318 are selectively located to provide cooling flow to one or more engine components and/or control a rate of cooling flow to the one or more engine components. For example, a high density of the one or more of the openings 318 may be located near the rear portion of the stator plenum 216 (e.g., exterior of the LP turbine 120) to selectively provide cooling flow to the LP turbine 120. In the illustrated example of FIG. 3, each one of the openings 318 has a diameter of substantially (e.g., within 10 percent) the same size. In other examples, each one of the openings 318 can have a different diameter. In some examples, the diameter of the openings 318 can be selectively sized to control the rate of cooling flow to the one or more engine components. For example, the openings 318 can be evenly distributed from the front of the stator plenum 216 to the rear of the stator plenum 216. However, a first plurality of openings 318 near the front of the stator plenum 216 can have a smaller (e.g., 50 percent smaller) diameter than a second plurality of openings 318 near the rear of the stator plenum 216. In this example, the turbine component interior of the rear of the stator plenum 216 can receive a higher volume or rate of cooling flow than the turbine component interior of the front of the stator plenum 216.

During operation of the turbofan 100, the cavity 220 formed by the example stator plenum 216 can undergo a high air pressure condition. For example, a flow rate of the cooling flow 224 entering the cavity 220 can be substantially (e.g., 30 percent) higher than a flow rate of the cooling flow 224 leaving the cavity 220 (e.g., through the openings 318). In particular, the high pressure condition of the cavity 220 can occur during transient (e.g., non-steady state) operation of the turbofan 100. During the high pressure condition, the air pressure inside the cavity 220 exhibits loads on the stator plenum 216. If the stator plenum 216 is fixedly coupled to the rear combustor casing 208, the loads caused by the high pressure condition can cause a failure (e.g., material fracture, loss of seal, etc.) of the stator plenum. Therefore, it is desirable to configure the stator plenum 216 such that the stator plenum 216 is not fixedly coupled. In other words, it is desirable to configure one or more of the joints (e.g., the intermediate flange joint assembly 210 and/or the rabbet joint assembly 218) of the stator plenum 216 such that the stator plenum 216 is allowed to move (e.g., radially and/or axially) while the front seal and the rear seal are maintained.

As such, the rabbet joint assembly 218 illustrated in FIG. 3 is configured to allow the stator plenum 216 to move (e.g., radially and/or axially) while the rear seal is maintained. The angled portion 312 of the rabbet flange 306 is adjacent to the angled portion 314 of the plenum end rabbet 308. Upon assembly of the stator plenum 216 to the turbofan 100, friction force between the angled portion 312 and the angled portion 314 maintains the location of the plenum end rabbet 308 within the cavity 310. In a steady state condition, a space 320 is formed between an end of the plenum end rabbet 308 and the rabbet flange 306. During a high air pressure condition when the air pressure loads the stator plenum 216, the plenum end rabbet 308 can shift (e.g., move) within the cavity 310 of the rabbet flange 306 due to the space 320 and the angled portions 312, 314. However, when the plenum end rabbet 308 shifts within the cavity 310, the second seal is maintained. Because the rabbet joint assembly 218 allows for movement of the stator plenum 216, the front joint (e.g., the intermediate flange joint assembly 210) of the stator plenum 216 can be a fixed coupling which maintains the first seal during all operating conditions. Thus, the stator plenum 216 can move (e.g., radially and/or axially) during operation of the turbofan 100 while maintaining the first and the second seals.

As described above, the stator plenum 216 can be axially compressed for installation and can maintain an axial load during engine operation in order to maintain the first seal and the second seal. Further, the axial load on the stator plenum 216 can increase during engine operation, for instance, during transient (e.g., non-steady state) operation. If the stator plenum 216 is exposed to prolonged or excessive axial loads (e.g., axial loads above a threshold), failure (e.g., material fracture, loss of seal, etc.) of the stator plenum 216 can occur. In order to reduce the axial forces experienced by the stator plenum 216, the stator plenum 216 includes a flexible portion 322. The flexible portion 322 is located between the front end of the stator plenum 216 and the rear end of the stator plenum 216. The flexible portion 322 is formed by one or more bends in the outer surface 324 of the stator plenum 216. The flexible portion 322 forms a cavity 326. The cavity 326 is a portion of the plenum cavity 220. When the stator plenum 216 experiences axial forces, the flexible portion 322 can provide a location along the outer surface 324 for elastic deformation of the stator plenum 216. The elastic deformation can reduce the axial load experienced by the stator plenum 216. Thus, the flexible portion 322 can reduce the axial load experienced by the stator plenum 216.

Additionally, the flexible portion 322 can provide a location along the outer surface 324 for elastic deformation of the stator plenum 216 during installation. For example, after installing the plenum flange 302 within the intermediate flange joint assembly 210, the stator plenum 216 can be compressed via elastic deformation at the flexible portion 322 for insertion of the plenum end rabbet 308 into the cavity 310 of the rabbet flange 306. Additionally, the flexible portion 322 can be configured to minimize or otherwise reduce aerodynamic drag along the outer surface 324 of the stator plenum 216. The flexible portion 322 and, thus, the cavity 326 can have different shapes as shown in FIGS. 4 and 5 below.

Figure 4:
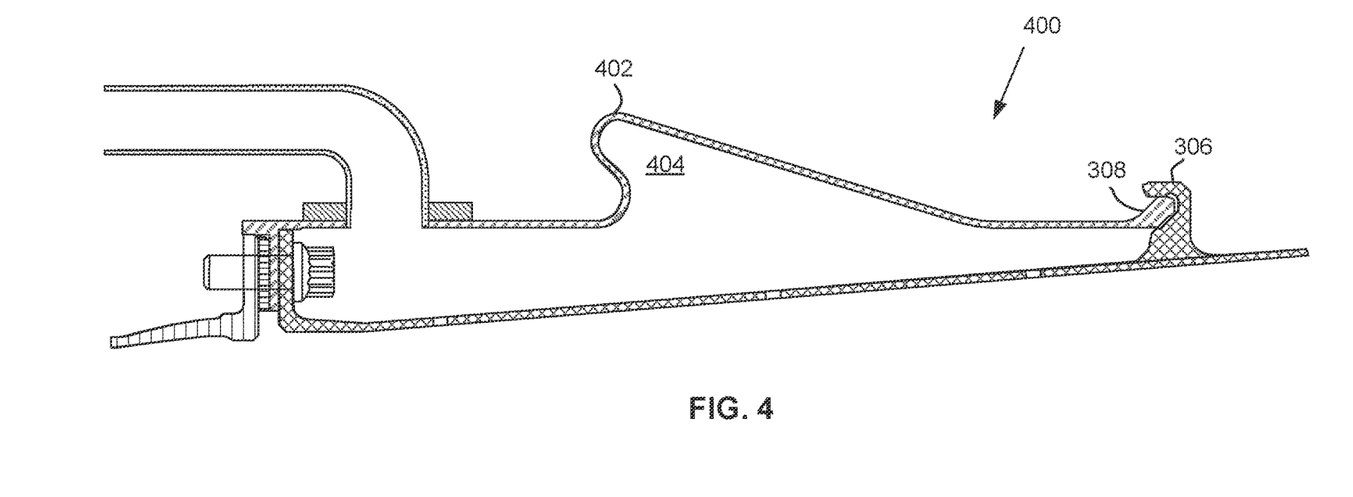
FIG. 4 illustrates an example cross-sectional side view of a second example stator plenum.

FIG. 4 illustrates an example cross-sectional side view of a second example stator plenum 400. The second example stator plenum 400 disclosed herein can be implemented with the turbofan 100 of FIG. 1 and/or the core turbine 104 of FIG. 2. The second example stator plenum 400 includes a flexible portion 402 forming a cavity 404. The flexible portion 402 of the example stator plenum 400 of FIG. 4 has a different shape than the flexible portion 322 of the example stator plenum 216 of FIGS. 2 and/or 3. As a result, the cavity 404 of the example stator plenum 400 of FIG. 4 has a different shape than the cavity 326 of the example stator plenum 216 of FIGS. 2 and/or 3. The flexible portion 402 of the stator plenum 400 of FIG. 4 can have different properties (e.g., aerodynamic drag, elastic deformation properties) than the flexible portion 322 of the stator plenum 216 of FIGS. 2 and/or 3. The example stator plenum 400 includes the plenum end rabbet 308 coupled to the rabbet flange 306.

Figure 5:
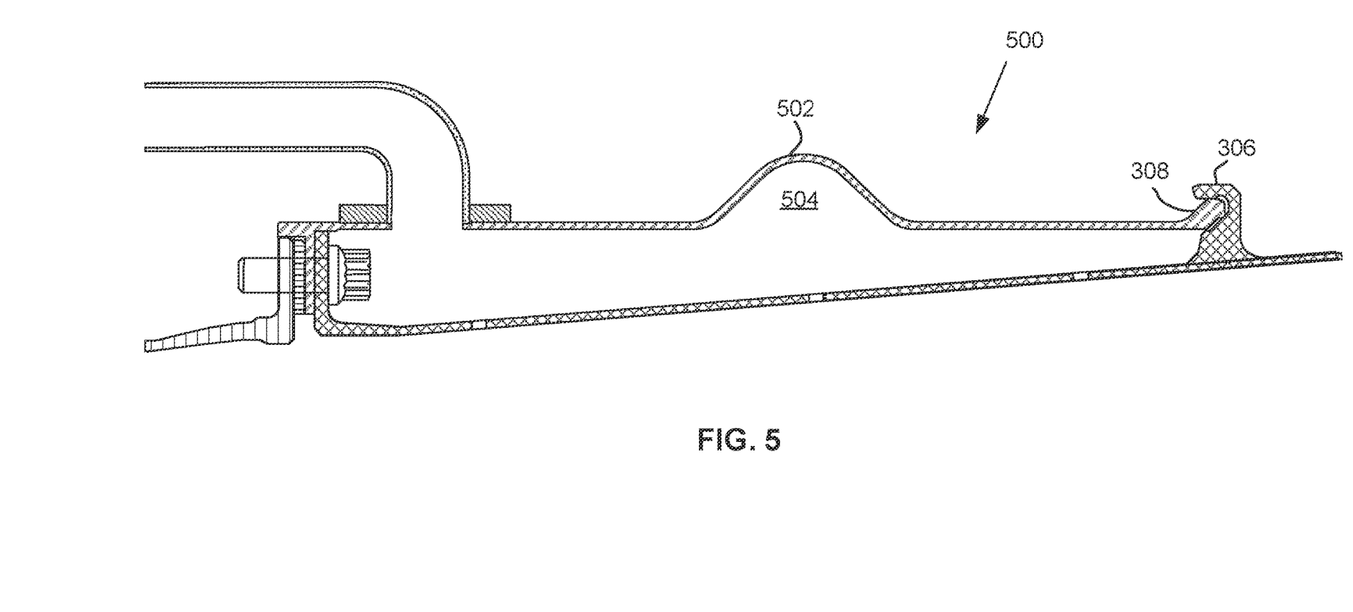
FIG. 5 illustrates an example cross-sectional side view of a third example stator plenum.

FIG. 5 illustrates an example cross-sectional side view of a third example stator plenum 500. The third example stator plenum 500 disclosed herein can be implemented with the turbofan 100 of FIG. 1 and/or the core turbine 104 of FIG. 2. The third example stator plenum 500 includes a flexible portion 502 forming a cavity 504. The flexible portion 502 of the example stator plenum 500 of FIG. 5 has a different shape than the flexible portion 322 of the example stator plenum 216 of FIGS. 2 and/or 3 and the flexible portion 402 of the example stator plenum 400 of FIG. 4. As a result, the cavity 504 of the example stator plenum 500 of FIG. 5 has a different shape than the cavity 326 of the example stator plenum 216 of FIGS. 2 and/or 3 and the cavity 404 of the example stator plenum 400 of FIG. 4. The flexible portion 502 of the stator plenum 500 of FIG. 5 can have different properties (e.g., aerodynamic drag, elastic deformation properties) than the flexible portion 402 of the stator plenum 400 of FIG. 4 and/or the flexible portion 322 of the stator plenum 216 of FIGS. 2 and/or 3. The example stator plenum 500 includes the plenum end rabbet 308 coupled to the rabbet flange 306.

Figure 6:
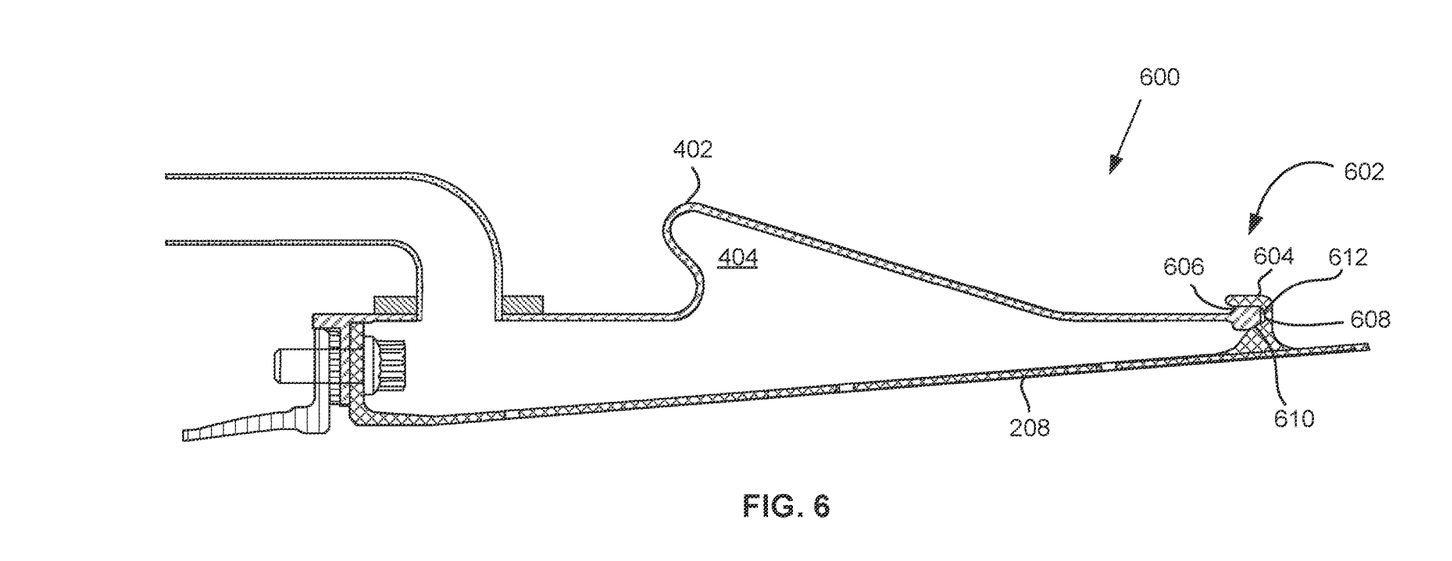
FIG. 6 illustrates an example cross-sectional side view of a fourth example stator plenum.

FIG. 6 illustrates an example cross-sectional side view of a fourth example stator plenum 600. The fourth example stator plenum 600 disclosed herein can be implemented with the turbofan 100 of FIG. 1 and/or the core turbine 104 of FIG. 2. The example stator plenum 600 of FIG. 6 includes the flexible portion 402 forming the cavity 404. In the example of FIG. 6, a rabbet joint assembly 602 includes a rabbet flange 604 and a plenum end rabbet 606. The rabbet flange 604 is coupled to the rear combustor casing 208. The rabbet flange 604 forms a cavity 608. The cavity 608 includes an angled portion 610. In the example of FIG. 6, the angled portion 610 is located on an interior portion (e.g., closer to the axial centerline axis 102 of FIG. 2) of the cavity 608. The plenum end rabbet 606 of FIG. 6 does not include a corresponding angled portion to the angled portion 610 of the rabbet flange 604. The rabbet flange 604 includes a space 612. In the example of FIG. 6, the space 612 is between a rear end of the plenum end rabbet 606 and a front surface of the cavity 608.

Figure 7:
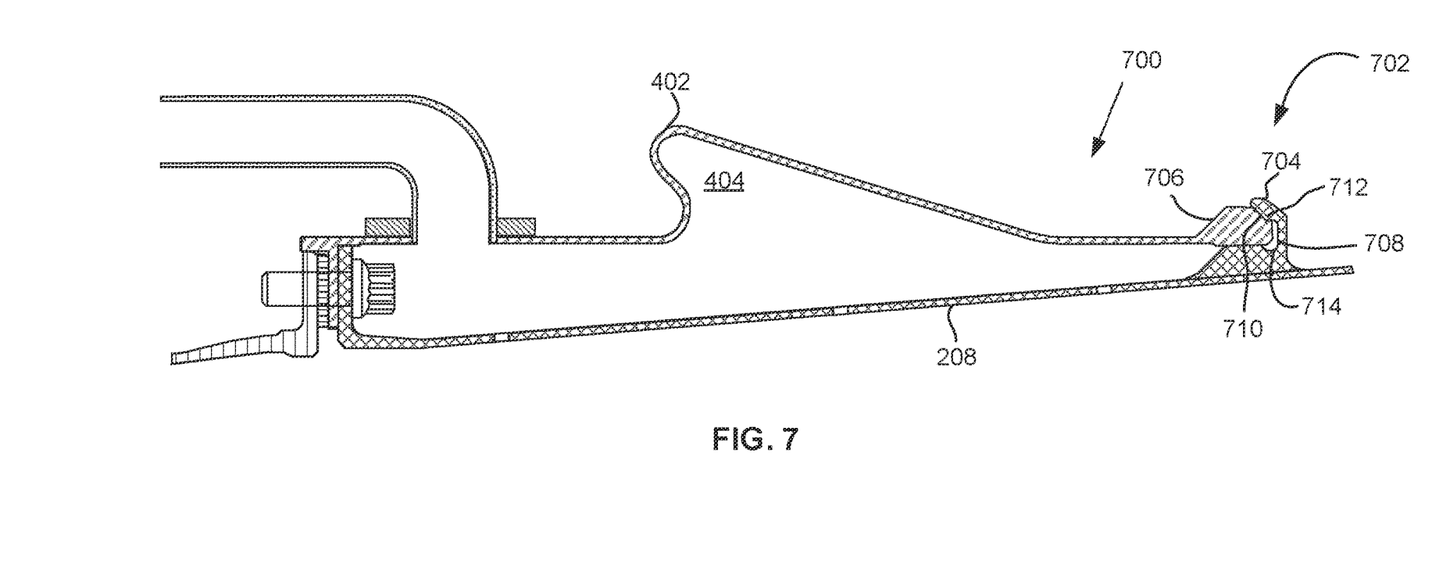
FIG. 7 illustrates an example cross-sectional side view of a fifth example stator plenum.

FIG. 7 illustrates an example cross-sectional side view of a fifth example stator plenum 700. The fifth example stator plenum 700 disclosed herein can be implemented with the turbofan 100 of FIG. 1 and/or the core turbine 104 of FIG. 2. The example stator plenum 700 of FIG. 7 includes the flexible portion 402 forming the cavity 404. In the example of FIG. 7, a rabbet joint assembly 702 includes a rabbet flange 704 and a plenum end rabbet 706. The rabbet flange 704 is coupled to the rear combustor casing 208. The rabbet flange 704 forms a cavity 708. The cavity 708 includes an angled portion 710. In the example of FIG. 7, the angled portion 710 is located on an exterior portion (e.g., away from the axial centerline axis 102 of FIG. 2) of the cavity 708. The plenum end rabbet 706 of FIG. 6 includes a corresponding angled portion 712. The rabbet flange 704 includes a space 714. In the example of FIG. 7, the space 714 is between a rear end of the plenum end rabbet 706 and front and inner surfaces of the cavity 708.

The stator plenum 216, the stator plenum 400, the stator plenum 500, the stator plenum 600, and/or the stator plenum 700 can be combined, divided, re-arranged, etc. For example, the flexible portions 322, 402, 502 can be combined with any of the plenum end rabbets 308, 606, 706. In some examples, the flexible portion of the stator plenums 216, 400, 500, 600, 700 can vary in shape along a circumference of the stator plenum. Additionally or alternatively, the plenum end rabbet of the stator plenums 216, 400, 500, 600, 700 can vary in shape along the circumference of the stator plenum.

The stator plenum 216, the stator plenum 400, the stator plenum 500, the stator plenum 600, and/or the stator plenum 700 can provide cooling for engine components during engine operation. At least the stator plenum 216, 400, 500, 600, 700 can implement a means for containing cooling flow. The rabbet flange 306 can provide a means for coupling the stator plenum 216, 400, 500, 600, 700 to an engine casing. In some examples, the coupling is a non-fixed coupling such as a ball and socket joint, a pivot joint, etc. The rabbet flange 306 can provide a means for sealing the stator plenum 216, 400, 500, 600, 700 to an engine casing. At least the plenum end rabbet 308, 606, 706 can implement a means for coupling the stator plenum 216, 400, 500, 600, 700 to an engine casing. At least the plenum end rabbet 308, 606, 706 and/or the rabbet flange 306, 604, 704 can implement a means for sealing the stator plenum 216, 400, 50, 600, 700 to the engine casing. At least the plenum end rabbet 308, 606, 706 and/or the rabbet flange 306, 604, 704 can implement a means for allowing movement of the stator plenum 216, 400, 50, 600, 700 while maintaining a seal. The flexible portions 322, 402, 502 can provide means for reducing axial load on the stator plenum 216, 400, 500, 600, 700.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

From the foregoing, it will be appreciated that the above disclosed methods, apparatus, and articles of manufacture have been disclosed to provide improved cooling for engine components of gas turbine engines. The disclosed methods, apparatus and articles of manufacture provide containment structures for cooling flow. The containment structures improve the cooling of the gas turbine engines by directing the cooling flow to one or more engine components while containing the cooling flow from escaping to an exterior space such as the bypass airflow area. Improved cooling of the engine components can improve engine efficiency as well as reduce wear on engine components due to thermal loads. Examples disclosed herein provide a combination of fixed and non-fixed couplings as well as selectively flexible structures to allow for containment of the cooling flow without failure of the seals forming the containment space or the containment structure itself.

Example methods, apparatus, systems, and articles of manufacture to implement a stator plenum with collect seal are disclosed herein. Further examples and combinations thereof include the following: Example 1 includes a stator plenum for a gas turbine engine, the stator plenum comprising an outer shell circumscribing a centerline axis, a first end of the outer shell coupled to an engine casing at a first coupling, the first coupling to form a first seal, a second end of the outer shell coupled to the engine casing at a second coupling, the second end formed by a thickened portion of the outer shell, the second coupling to form a second seal, and a cavity formed by the outer shell, the cavity to contain cooling flow to reduce a temperature of a turbine.

Example 2 includes the stator plenum of any preceding clause, wherein the first coupling is a fixed coupling and the second coupling is a non-fixed coupling.

Example 3 includes the stator plenum of any preceding clause, further including a flexible portion of the outer shell to reduce an axial load on the stator plenum.

Example 4 includes the stator plenum of any preceding clause, wherein the flexible portion is formed by one or more bends in the outer shell.

Example 5 includes the stator plenum of any preceding clause, wherein the first coupling is formed via a fastener.

Example 6 includes the stator plenum of any preceding clause, wherein the engine casing includes an annular flange with a second cavity to receive the second end of the outer shell.

Example 7 includes the stator plenum of any preceding clause, wherein the second coupling is formed by the second end of the outer shell inserted in the second cavity.

Example 8 includes the stator plenum of any preceding clause, wherein the second end of the outer shell includes a friction angle.

Example 9 includes the stator plenum of any preceding clause, wherein the outer shell is axially compressed between the first end and the second end.

Example 10 includes the stator plenum of any preceding clause, wherein the axial compression is to provide sealing for the second seal.

Example 11 includes the stator plenum of any preceding clause, wherein the cooling flow is a compressor bleed air flow.

Example 12 includes a gas turbine engine, comprising a compressor, a combustion section, an engine casing including a first cavity, a turbine, a shaft to rotatably couple the compressor and the turbine, and a stator plenum, the stator plenum including an outer shell circumscribing a centerline axis, a first end of the outer shell coupled to the engine casing at a first coupling, the first coupling to form a first seal, a second end of the outer shell received within the first cavity of the engine casing at a second coupling, the second coupling to form a second seal, and a second cavity formed by the outer shell to contain a cooling flow to reduce a temperature of the turbine.

Example 13 includes the gas turbine engine of any preceding clause, wherein the first cavity is tapered axially away from the second end.

Example 14 includes the gas turbine engine of any preceding clause, wherein the second end of the outer shell is tapered axially toward the first cavity.

Example 15 includes the gas turbine engine of example 12, wherein the first end of the outer shell is fixedly coupled to the engine casing and the second end of the outer shell is non-fixedly coupled to the engine casing.

Example 16 includes the gas turbine engine of any preceding clause, further including a flexible portion of the outer shell to reduce an axial load on the outer shell.

Example 17 includes the gas turbine engine of any preceding clause, wherein the engine casing includes openings to allow the cooling flow to travel from the cavity to the turbine.

Example 18 includes the gas turbine engine of any preceding clause, wherein the openings include a first portion with a first diameter and a second portion with a second diameter.

Example 19 includes the gas turbine engine of any preceding clause, wherein the cooling flow is a bleed air flow from the compressor.

Example 20 includes an apparatus for cooling a gas turbine engine, the apparatus comprising means for containing cooling flow, means for fixedly coupling a first end of the means for containing to an engine casing, means for non-fixedly coupling the second end of the means for containing to the engine casing, and means for reducing an axial load on the means for containing cooling flow.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. A stator plenum for a gas turbine engine, the stator plenum comprising:
   an outer shell circumscribing a centerline axis;
   an engine casing circumscribing the centerline axis, wherein the engine casing is positioned between the outer shell and the centerline axis in a radial direction defined by the gas turbine engine, wherein the engine casing includes a flange defining a first cavity;
   a first end of the outer shell coupled to the engine casing at a first coupling, the first coupling to form a first seal;
   a second end of the outer shell coupled to the engine casing at a second coupling, the second end formed by a thickened portion of the outer shell, wherein the thickened portion is at least partially positioned in the first cavity, wherein a space is defined between the second end and the flange, wherein the thickened portion extends to the space, the second coupling to form a second seal, wherein the first coupling is a fixed coupling and the second coupling is a non-fixed coupling;
   a second cavity formed between the engine casing and the outer shell, the second cavity to contain a cooling flow to reduce a temperature of a turbine; and
   a flexible portion of the outer shell to reduce an axial load on the stator plenum.

2. The stator plenum of claim 1, wherein the flexible portion is formed by one or more bends in the outer shell.

3. The stator plenum of claim 1, wherein the first coupling is formed via a fastener.

4. The stator plenum of claim 1, wherein the flange is an annular flange.

5. The stator plenum of claim 4, wherein the second coupling is formed by the second end of the outer shell inserted in the first cavity.

6. The stator plenum of claim 1, wherein the outer shell is axially compressed between the first end and the second end.

7. The stator plenum of claim 6, wherein the axial compression is to provide sealing for the second seal.

8. The stator plenum of claim 1, wherein the cooling flow is a compressor bleed air flow.

9. A stator plenum for a gas turbine engine, the stator plenum comprising:
   an outer shell circumscribing a centerline axis;
   an engine casing positioned radially inward of the outer shell, the engine casing including a flange;
   a first end of the outer shell coupled to the engine casing at a first coupling, wherein the first coupling is a fixed coupling, the first coupling to form a first seal;
   a second end of the outer shell coupled to the engine casing at a second coupling, the second end formed by a thickened portion of the outer shell, wherein the thickened portion includes a section having a maximum thickness measurable in a radial direction defined by the gas turbine engine, wherein opposite radial ends of the section defining the maximum thickness of the thickened portion are in contact with the flange, the second coupling to form a second seal, wherein the second end of the outer shell includes a friction angle;

a cavity formed by the outer shell, the cavity to contain a cooling flow to reduce a temperature of a turbine; and a flexible portion of the outer shell to reduce an axial load on the outer shell.

10. A gas turbine engine comprising:

a compressor;

a combustion section;

an engine casing including a first cavity;

a turbine;

a shaft to rotatably couple the compressor and the turbine; and a stator plenum, the stator plenum including:
- an outer shell circumscribing a centerline axis, wherein a second cavity is formed by the outer shell to contain a cooling flow to reduce a temperature of the turbine;
- a first end of the outer shell coupled to the engine casing at a first coupling, wherein the first coupling is a fixed coupling, the first coupling to form a first seal at a first end of the second cavity;
- a second end of the outer shell received within the first cavity of the engine casing at a second coupling, the second coupling to form a second seal at a second end of the second cavity opposite the first end, wherein the second end of the outer shell is formed by a thickened portion of the outer shell, wherein the thickened portion includes an inner radial angled surface and an outer radial angled surface, wherein the inner radial angled surface contacts the engine casing, and wherein the inner radial angled surface and the outer radial angled surface are facing opposite directions; and
- a flexible portion of the outer shell to reduce an axial load on the outer shell.

11. The gas turbine engine of claim 10, wherein the first cavity is tapered axially away from the second end.

12. The gas turbine engine of claim 10, wherein the first end of the outer shell is fixedly coupled to the engine casing and the second end of the outer shell is non-fixedly coupled to the engine casing.

13. The gas turbine engine of claim 10, wherein the engine casing includes openings to allow the cooling flow to travel from the second cavity to the turbine.

14. The gas turbine engine of claim 13, wherein the openings include a first portion with a first diameter and a second portion with a second diameter.

15. The gas turbine engine of claim 10, wherein the cooling flow is a bleed air flow from the compressor.

16. An apparatus for cooling a gas turbine engine, the apparatus comprising:

means for containing cooling flow;

means for fixedly coupling a first end of the means for containing to an engine casing, the means for fixedly coupling to form a first seal;

means for non-fixedly coupling a second end of the means for containing to the engine casing;

means for allowing movement of the means for containing cooling flow while maintaining a second seal at the means for non-fixedly coupling via a friction force at the second end; and means for enabling elastic deformation of the means for containing when the means for fixedly coupling is coupled to the engine casing and the means for non-fixedly coupling is not coupled to the engine casing during installation, wherein the means for enabling elastic deformation enables the means for containing to compress in an axial direction and subsequently decompress in the axial direction during installation.

17. The apparatus of claim 16, the means for non-fixedly coupling is formed by a thickened portion of the means for containing.

* * * * *